Jan. 5, 1971  A. M. FOOTE  3,552,049
TRAVELLING BELT DISPLAY

Filed Jan. 4, 1968  7 Sheets-Sheet 2

Allen M. Foote
INVENTOR.

BY *Clarence A. O'Brien*
*and Harvey B. Jacobson*
Attorneys

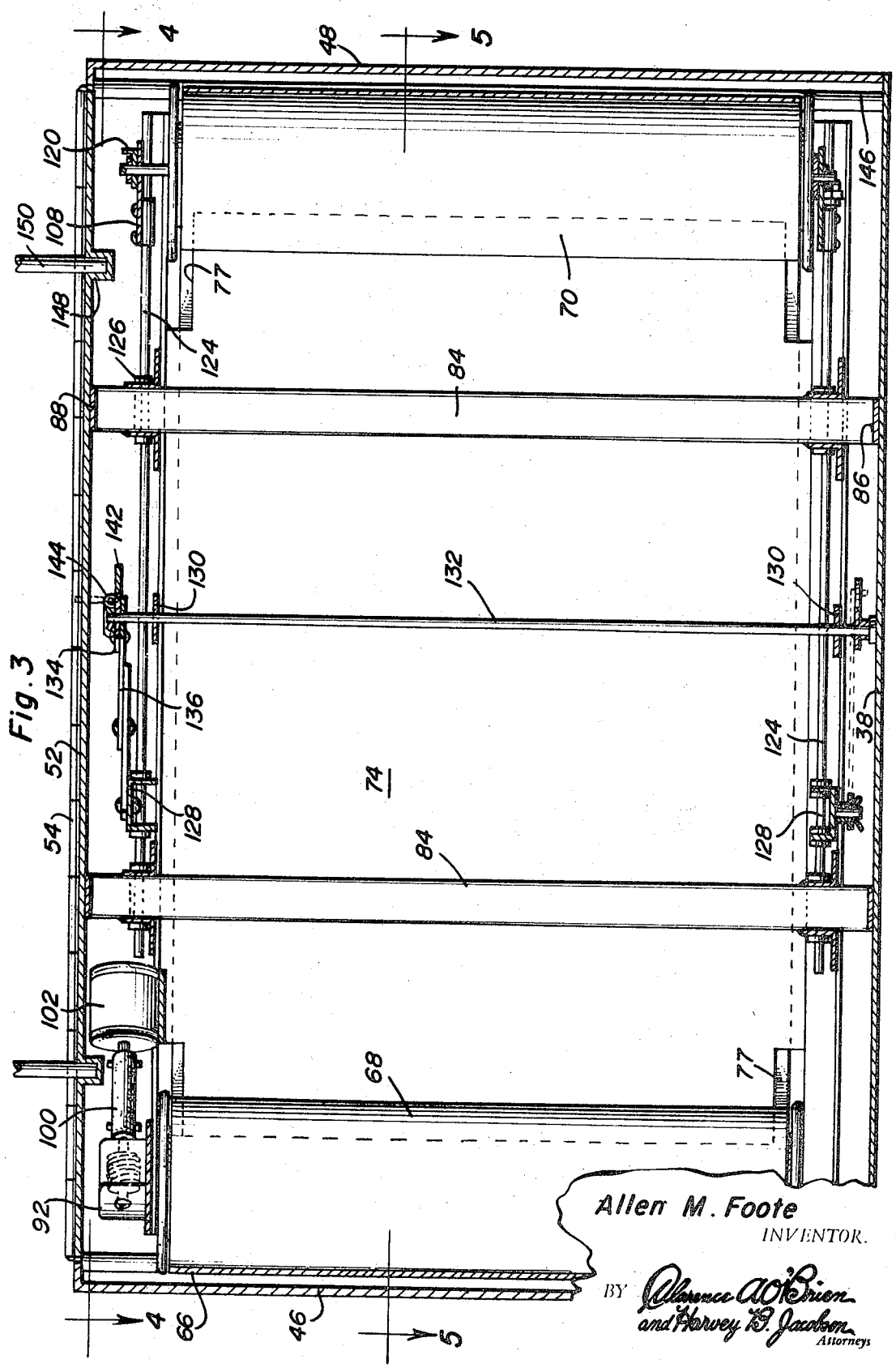

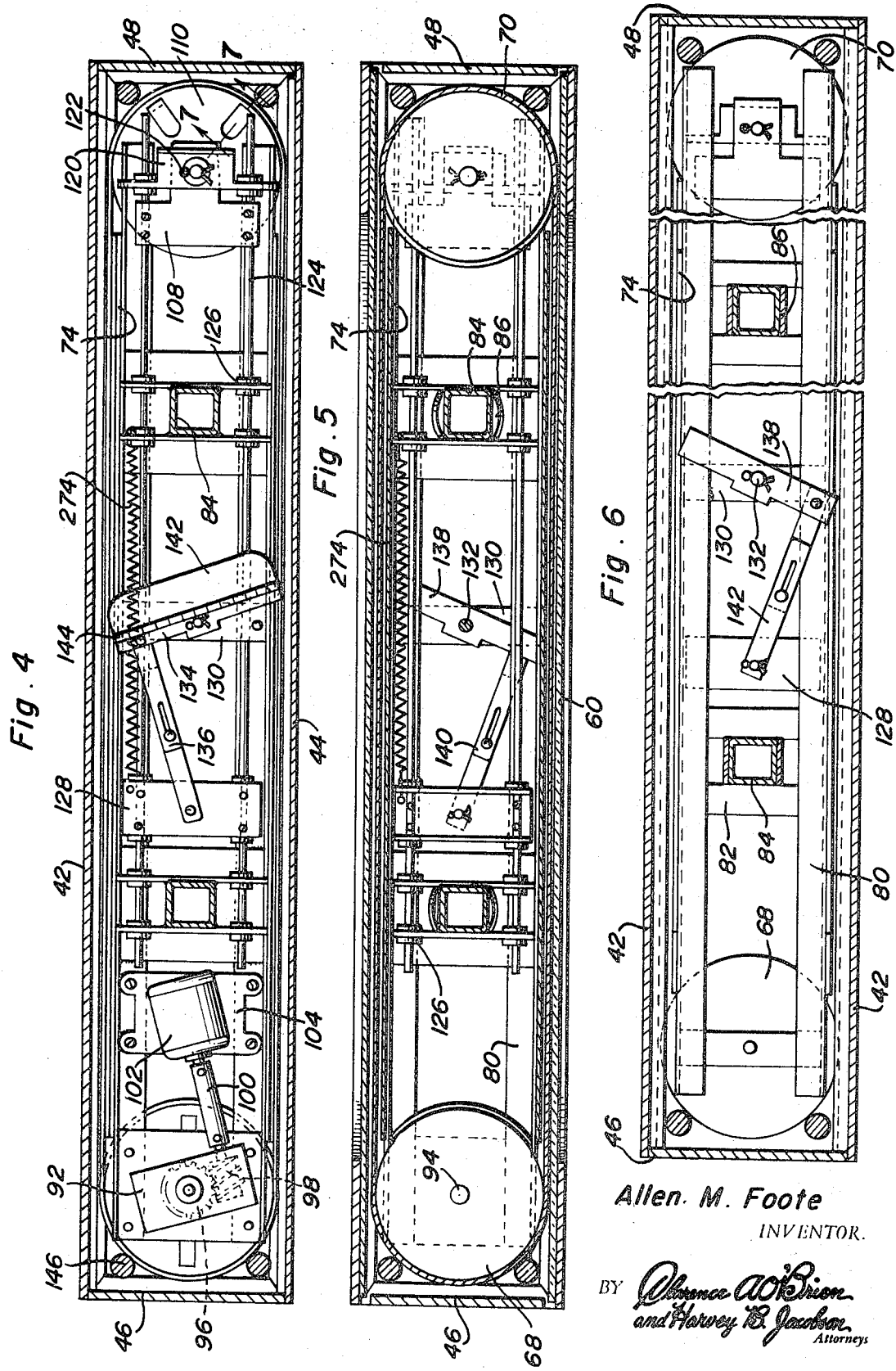

Jan. 5, 1971   A. M. FOOTE   3,552,049
TRAVELLING BELT DISPLAY
Filed Jan. 4, 1968   7 Sheets-Sheet 5
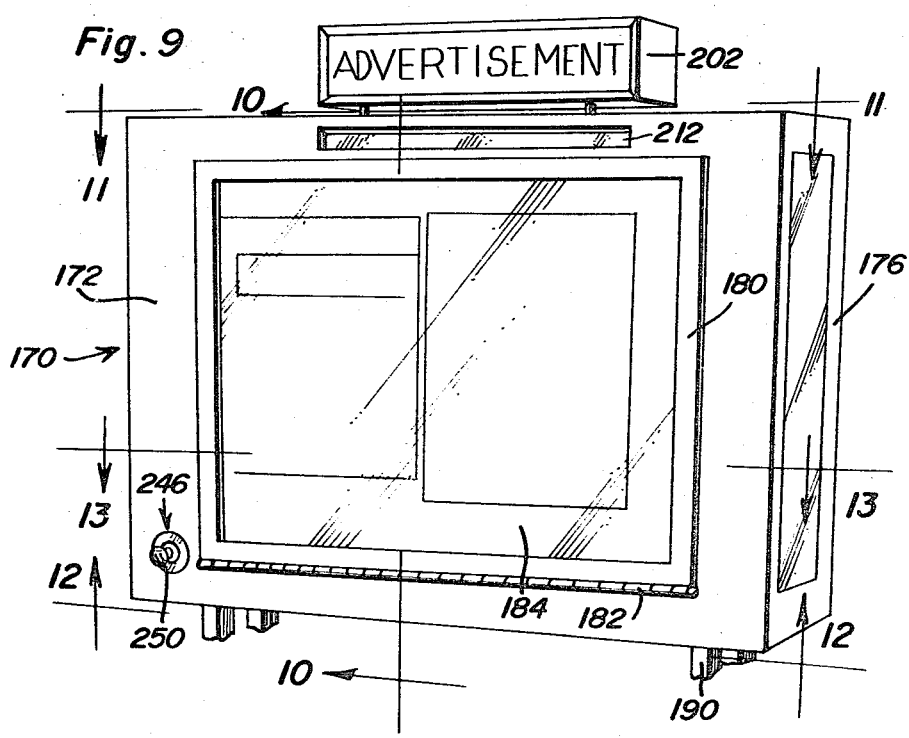
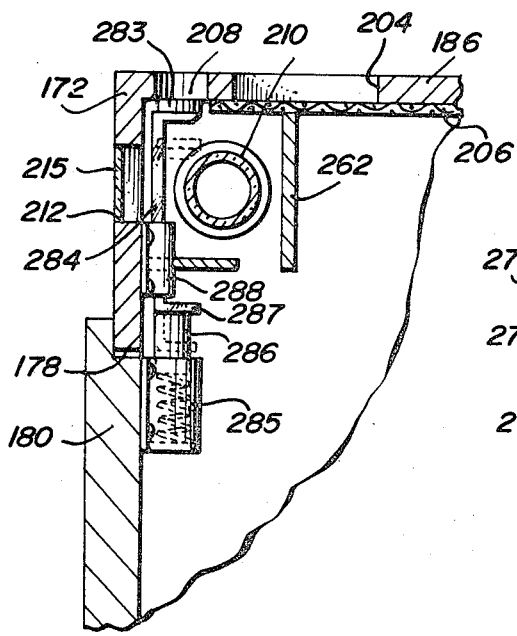
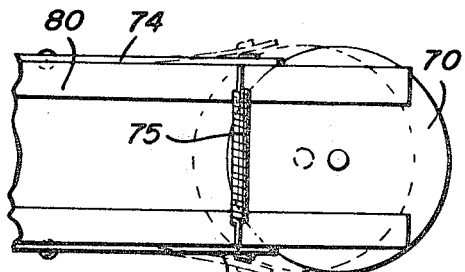
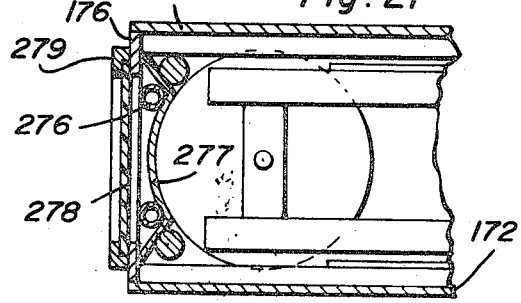
Allen M. Foote INVENTOR.
BY *Clarence A. O'Brien and Harvey B. Jackson*
Attorneys

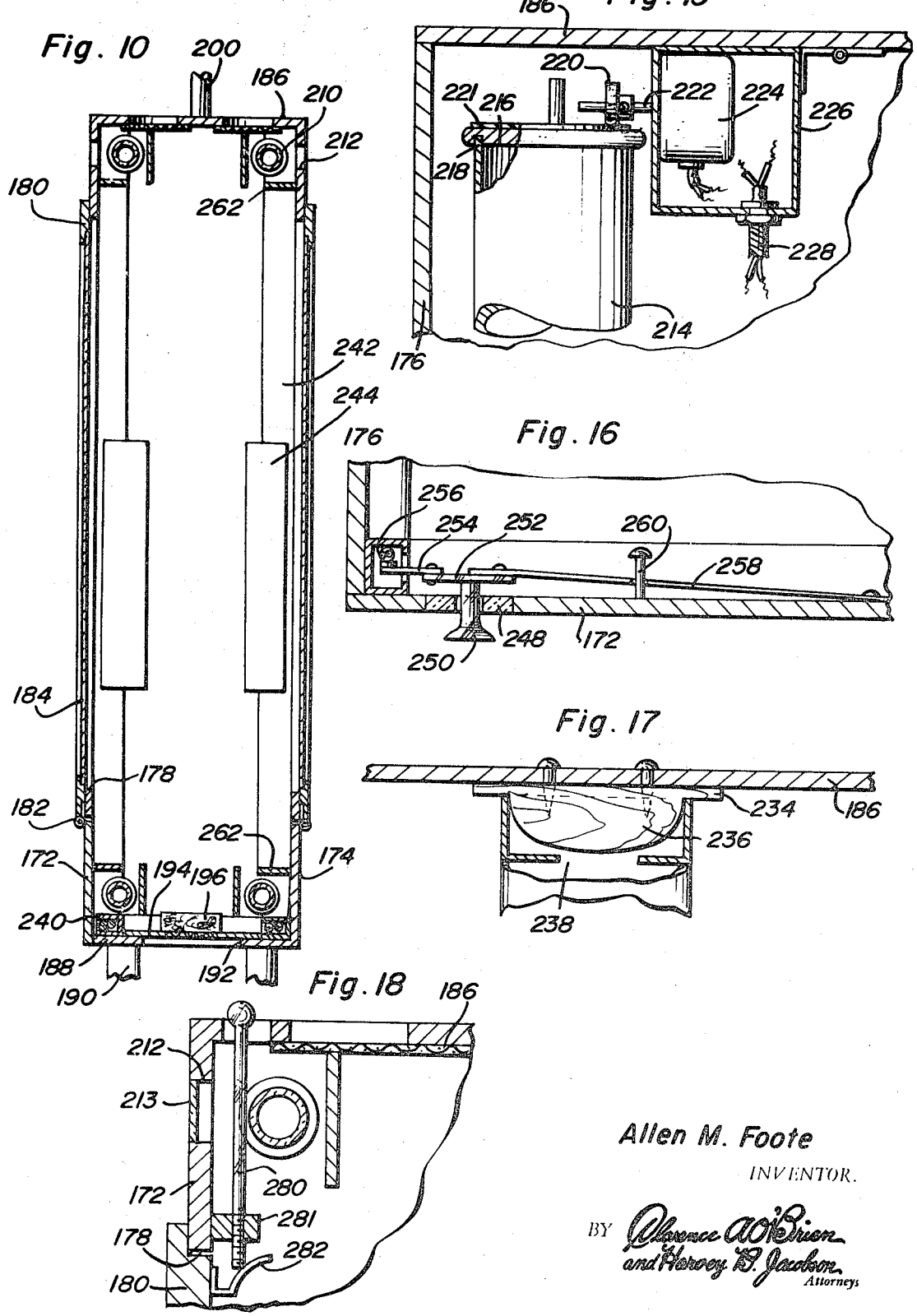

United States Patent Office 3,552,049
Patented Jan. 5, 1971

3,552,049
TRAVELLING BELT DISPLAY
Allen M. Foote, Flat Rock, N.C., assignor of fifty percent to Ted L. Somerville, Atlanta, Ga.
Filed Jan. 4, 1968, Ser. No. 695,664
Int. Cl. G09f 11/28
U.S. Cl. 40—32
7 Claims

ABSTRACT OF THE DISCLOSURE

A display machine employing an endless belt as a carrier for various messages which can be printed, drawn or otherwise associated with the belt for movement past a viewing area for observation. The travelling belt may be illuminated and stopped at a desired position by a viewer operated switch. The machine includes a novel mechanism for moving the rollers over which the belt is entrained relative to each other for enabling removal of the belt and also to retain the belt in taut condition.

---

The display device of the present invention is in the form of a stand which may be oriented in any desired position for observation with a vertically disposed endless belt entrained over rollers with the belt passing a viewing area, being illuminated, driven at variable speeds and capable of starting and stopping by a viewer to enable careful observation of the material displayed.

An object of the present invention is to provide a travelling belt display including an endless belt entrained over spaced aligned vertically disposed rollers interconnected in such a manner that the rollers may be moved relative to each other with both ends thereof being simultaneously movable to loosen and tighten the belt in relation to the rollers.

Another object of the present invention is to provide a travelling belt display machine in the form of a stand having a foot operated switch associated therewith to enable a viewer to stop the belt display at any desired point.

A further object of the present invention is to provide a travelling belt display machine in the form of a vertically disposed cabinet having a closure at the upper end thereof by which the interior framework, rollers and associated structure may be lifted or removed from the cabinet to facilitate replacement of the belt.

Another important object of the present invention is to provide a travelling belt display machine which is simple in construction, easy to use, capable of receiving various materials for display purposes and relatively inexpensive to manufacture.

These together with other objects and advantages which will become subsequently apparent reside in the details of construction and operation as more fully hereinafter described and claimed reference being had to the accompanying drawings forming a part hereof, wherein like numerals refer to like parts throughout, and in which:

FIG. 3 is a longitudinal, vertical sectional view taken substantially upon a plane passing along section line 3—3 of FIG. 2 illustrating further structural details of the internal expansible frame;

FIG. 4 is a plan sectional view taken substantially upon a plane passing along section line 4—4 of FIG. 3 illustrating further structural details of the drive mechanism and the internal frame;

FIG. 5 is a longitudinal, plan sectional view taken substantially upon a plane passing along section line 5—5 of FIG. 3 illustrating further structural details of the internal frame;

FIG. 6 is bottom plan sectional view taken substantially upon a plane passing along section line 6—6 of FIG. 2 illustrating further structural details of the internal frame;

FIG. 9 is a perspective view of a modified embodiment of the present invention;

FIG. 10 is a vertical sectional view taken along section line 10—10 of FIG. 9 taken along section line 10—10 of FIG. 9 illustrating the structural details of this embodiment of the invention;

FIG. 15 is a fragmental sectional view illustrating the drive mechanism for the end roller and also illustrating the construction of the roller;

FIG. 16 is a detailed sectional view taken along section line 16—16 of FIG. 14 illustrating the construction of the control switch;

FIG. 17 is a transverse sectional view of the top lid illustrating the structure for retaining the frame within the cabinet;

FIG. 18 is a fragmental sectional view of the latch construction for the door;

FIG. 19 is a detailed sectional view illustrating another type of latch construction;

FIG. 20 is a fragmental view of the panels and retractable roller; and

FIG. 21 is a fragmental sectional view of a structure in which lights are provided in the ends of the cabinet.

Figure 1:
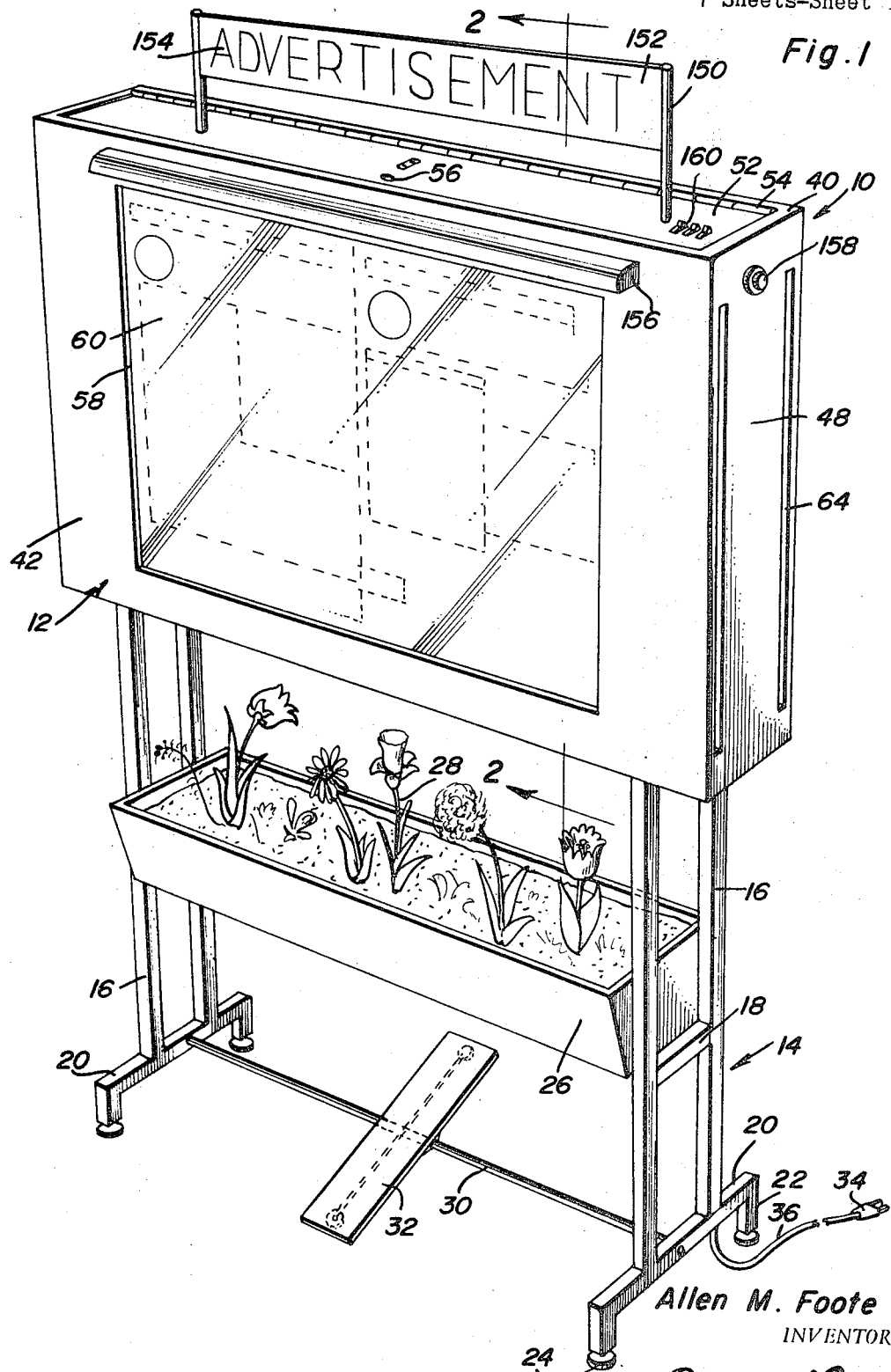
FIG. 1 is a perspective view of the travelling belt display machine of the present invention.
Figure 2:
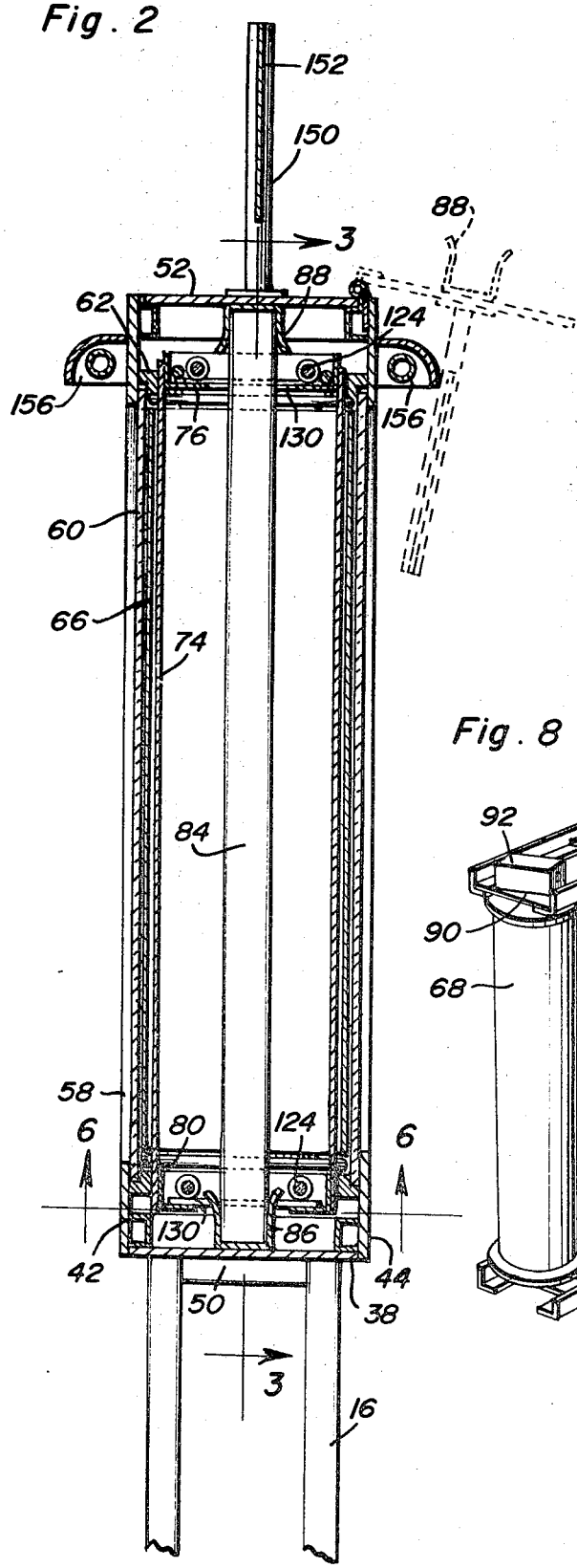
FIG. 2 is a vertical sectional view taken substantially upon a plane passing along section line 2—2 of FIG. 1 illustrating the structural details of the vertically disposed cabinet.

Referring now specifically to the drawings, the travelling belt display machine of the present invention is generally designated by reference numeral 10 and includes a vertically disposed hollow cabinet 12 which is supported in elevated position by a supporting stand generally designated by the numeral 14 which enables the dislay machine to be positioned in any desired location so that optimum viewing thereof may be accomplished.

The stand 14 includes a pair of upright tubular members 16 at each end thereof with each pair of uprights 16 being interconnected by a connector 18 at the center thereof and transversely extending bottom member 20 at the lower end thereof. The bottom member 20 extends beyond the uprights 16 and each end of the bottom member 20 terminates in a downwardly extending supporting leg 22 having a foot 24 thereon. The foot 24 may be universally swivelled and vertically adjustable to enable levelling of the display machine so that it may be placed on various types of supporting surfaces. Extending between the transverse connectors 18 is a longitudinal support (not shown) which serves as a support for a flower box or planter 26 which may have flowers, shrubs or other plants 28 therein which may be either natural plants growing in soil in the planter 26 or artificial plants, flowers and the like. Interconnecting the lower transverse members 20 is a tubular member 30 having a foot pedal 32 which extends to both sides of the tubular member 30 and is pivotally supported thereon for operation from either side of the display machine. The foot pedal 32 is in the form of a treadle which operates a switch mechanism when depressed in order to stop the travelling belt at a desired location in a manner described hereinafter. Also, a male electric plug 34 is provided on the end of an electrical conductor 36 for connecting the display machine to a female wall socket or any other source of electrical energy. The electrical conductor 36 extends through the tubular members to the foot operated switch and to other parts of the display machine as defined hereinafter.

The hollow cabinet 12 supported on the stand 14 includes a bottom wall 38, a top wall 40, relatively large side walls 42 and 44 and end walls 46 and 48 all of which are rigidly connected together to form a hollow cabinet with the bottom wall 38 being rigidly fixed to the uprights 16 in any sutable manner with the upper end of the uprights 16 also including an interconnecting member 50 to rigidify the uprights 16 and to form further support for the bottom wall 38. The top wall 40 includes an enlarged openable panel 52 attached to the edge of the opening in the top wall 40 which the panel 52 closes by a suitable hinge structure 54 with the opposite edge of the closure panel 52 being retained in closed position by a latch mechanism 56 of any suitable construction to enable access into the interior of the cabinet 12.

The two side walls 42 and 44 each have an enlarged viewing opening 58 therein provided with a transparent panel 60 engaging the inner surface of the side wall in order to form a closure for the viewing opening 58. The transparent panel 60 is slidably disposed in horizontal L-shaped guides 62 extending along the top and bottom edge of the viewing opening 58 and cooperating with the respective side walls to form a guide track for slidably receiving the top and bottom edges of the transparent panel 60 which may be inserted and removed through a pair of vertically disposed slots 64 in either or both end walls 46 and 48 whereby the transparent panels 60 may be removed completely or at least moved longitudinally to enable access to an endless display belt 66 disposed interiorly of the cabinet 12 and entrained over end rollers 68 and 70 carried by an internal frame generally designated by numeral 72. Thus, the display belt 66 is observable through the transparent panel 60 and the transparent panel 60 is removable to enable the material on the belt which is to be displayed to be changed or revised as desired. Disposed behind the viewing opening 58 and in spaced parallel relation to the transparent panel 60 and in close parallel relation to to the inner surface of the belt 66 where it passes the opening 68, there is provided a backing panel 74 of any suitable material to provide a rigid backing for the flexible belt 66 to facilitate changing of the material on the belt and also to retain the belt in a smooth condition for easy observation and to retain the bell in adjacent relation to the inner surface of the transparent panel 60. As illustrated, the structure of the viewing opening, transparent panel, belt, and backing panel 74 are duplicated on each side of the cabinet so that the cabinet may be viewed from either side thereof.

The internal frame 72 includes a air of upper longitudinal rails 76 interconnected by transervse members 78 and lower longitudinal rails 80 interconnected by connecting members 82 all of which may conveniently be in the form of angle iron material or the like. Interconnecting the upper transverse members 78 and lower transverse members 82 is a pair of generally parallel tubular members 84 which cooperate to form a rigid internal frame on which the backing sheets 74 are supported. The entire internal frame 72 is removable with the lower ends of the tubular members 84 which project below the rails 80 being removably received within a pair of upwardly opening U-shaped sockets 86 fixed to the bottom wall 38 and the upper ends of the tubular members 84 which extend above the rails 76 being removably received within downwardly facing U-shaped sockets or clips 88 attached to the undersurface of the closure panel 52 thus retaining the internal frame 72 centrally disposed between the side walls 42 and 44 but yet enable easy removal of the internal frame 72. The end roller 68 is stationarily journalled on the internal frame 72 by transverse support plates 90 with the upper support plate 90 including a gear box 92 mounted thereon receiving the shaft 94 for the roller 68 which has a gear 96 fixed thereon which is in meshing engagement with a worm gear 98 carried by a flexible shaft or the like 100 driven by motor 102 supported by supporting plate 104 attached to the upper rails 76 in a convenient manner thus enabling rotational movement of the roller 68. The motor 102 is a reversible motor and capable of being driven in either direction thus rotating the roller 68 in either direction for moving the belt 66 in either linear direction.

Figure 7:
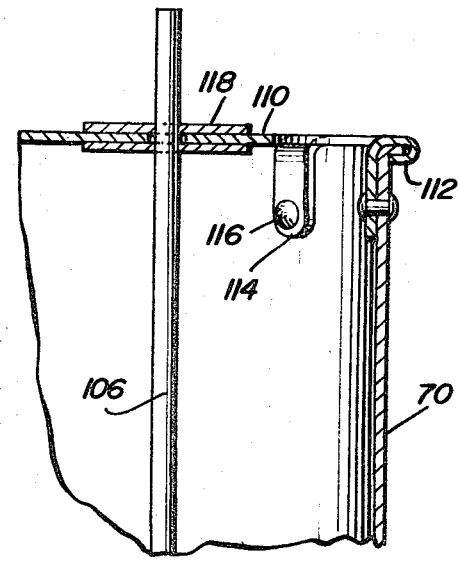
FIG. 7 is a detailed fragmental sectional view taken substantially upon a plane passing along section line 7—7 of FIG. 4 illustrating in more detail the construction of one of the end rollers for the endless belt.
Figure 8:
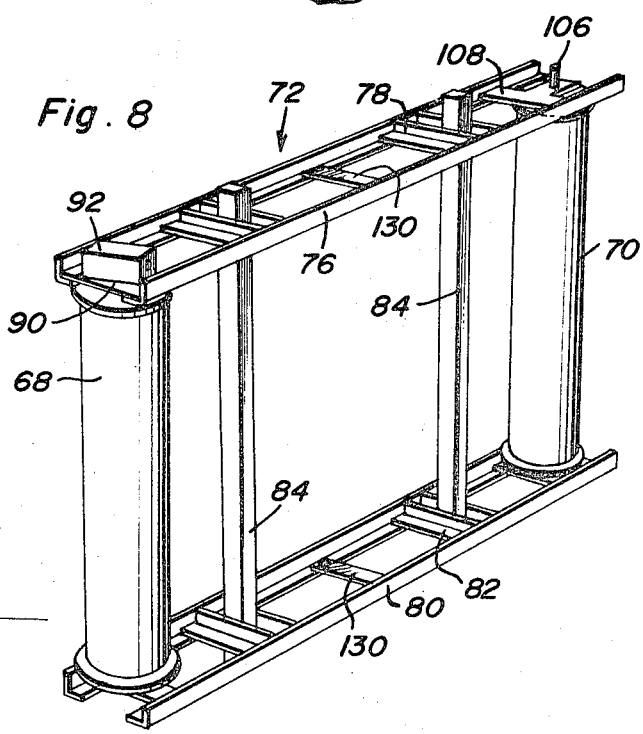
FIG. 8 is a perspective view illustrating the construction of the internal frame.
Figure 11:
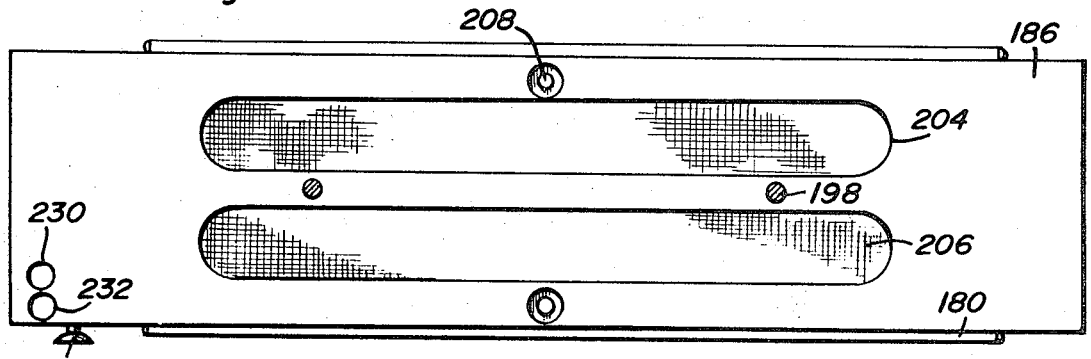
FIG. 11 is a plan view taken along reference line 11—11 of FIG. 9 illustrating the top construction of the cabinet.
Figure 12:
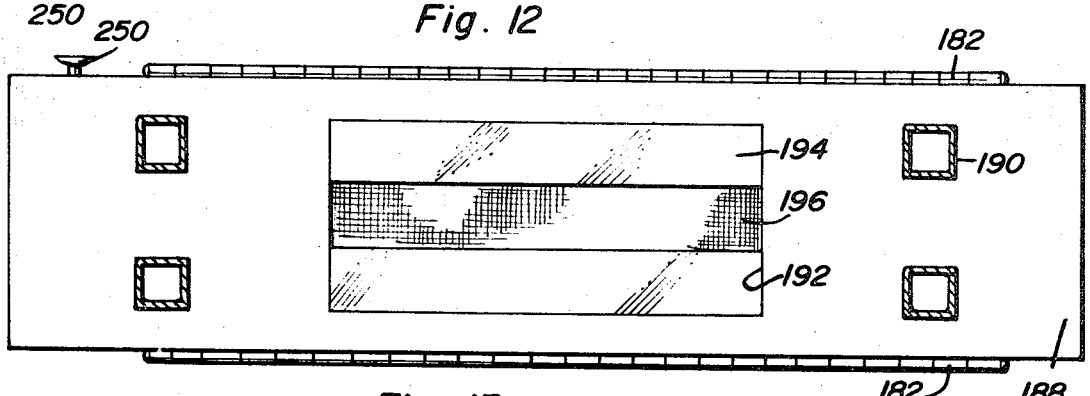
FIG. 12 is a bottom plan view of the cabinet taken along reference line 12—12 of FIG. 9 illustrating the bottom construction thereof.

The other roller 70 is also provided with a supporting shaft 106 which extends through the interior thereof and this shaft 106 is supported by a transversely extending plate 108 slidable on the rails 76 with a similar plate slidably supported on the rails 80 supporting the lower end of the roller 70 and shaft 106 extending therethrough. FIG. 7 illustrates the details of the roller 70 with the end bells or plates 110 having the peripheral edge 112 curled around an outwardly extending flange on the tubular roller 100 and the end wall 110 is provided with inwardly struck lugs 114 secured to the tubular roller 70 by suitable fasteners 116. Reinforcing plates 118 are secured to the inner and outer surface of the end plate or bell 110 for reinforcing the roller where it is supported by the shaft 106.

Both ends of the shaft 106 also extend through a slide plate 120 which is retained on the shaft 106 by a suitable washer and fastener assembly 122. The ends of the slide plate 120 are rigidly fixed to a pair of movable actuating rods 124 which extend parallel to the rails 76. A similar actuating rod structure 124, slide plate 120 and associated structure is provided in the bottom of the cabinet for supporting the lower end of the shaft 106. The elongated rods 124 extend parallel to each other and are slidably guided by guide sleeves on grommets 126 which are formed in the transverse brackets 78 on either side of the tubular uprights 84 as illustrated in FIG. 4. A similar structure is provided in the lower end of the cabinet.

The actuating rods 124 are interconnected by a plate 128 rigidly affixed to the rods 124 by suitable fasteners intermediate the tubular uprights 84 as illustrated in FIG. 4. Extending between the guide rails 76 in spaced relation to the plate 128 is a mounting plate 130 for a vertically disposed operating rod 132 which extends vertically from top to bottom of the internal frame 72 and is journalled in a similar plate parallel to the plate 130 between the lower rails 80. Fixed to the shaft 132 is a handle 134 which extends to either side of the axis of the shamt 132 and is connected to the plate 128 by a longitudinally adjustable connecting link 136 which is pivotally connected to the plate 128 and pivotally connected to the handle 134 which is in the form of a plate in offset relation to the shaft 132. The lower end of the shaft 132 is provided with a similar plate 138 which is connected to the plate similar to 128 at the lower end of the frame by an adjustable connecting link 140 substantially identical to the connecting link 136.

The handle or plate 134 is provided with an operating plate 142 which is pivoted to the plate 134 by a hinge structure 144 to enable the plate 142 to be pivoted from a flat horizontal position to an upright vertical position so that by twisting on the plate 142, the handle 134 is pivoted along with the shaft 132 which of course pivots the bottom plate 138. Thus, the connecting links 136 and 140 will be moved simultaneously thus moving the plates 128 connected to the upper and lower rods 124 thus moving the rods 124 simultaneously thus moving the slide plates 120 simultaneously for moving the upper and lower ends of the shaft 106 and roller 70 carried thereby simultaneously for either tightening or loosening the belt 66 and keeping the roller parallel.

Thus, with this construction, one of the rollers 68 is fixed longitudinally in relation to the frame and is reversibly driven where the roller 70 may be moved longitudinally of the frame for enabling easy replacement of the belt by moving the roller 70 inwardly, removing a belt through the opening in the top wall when panel 52 is open and replacing it with another belt and then moving the roller 70 outwardly. The folding actuating plate or handle 142 enables the internal frame to be disposed in underlying relation to the closure plate 52 and also the plate 130 serves as a convenient handle for lifting the internal frame inasmuch as the plate 130 is oriented generally at the center of the cabinet. The same outward pressure is applied to both the top and bottom ends of the roller by springs 274. For retaining the belt against the rollers in the event it becomes loose and to form generally a guide for the belt, the cabinet 12 is provided with vertically disposed rods 146 at each corner thereof for serving as a guide for the belt and a guide for the rollers to centralize the internal frame when being lowered into the clips 86 so that the clips 88 will engage the upper end of the tubular members 84.

The closure panel 52 and the top wall 40 is provided with a pair of sockets 148 for frictionally receiving a pair of upright supports 150 supporting therebetween a panel 152 having indicia 154 thereon in the form of an advertisement or other printed material relating to the material on the belt. Also, a lighting fixture 156 may be provided at the upper edge of each viewing opening 58 and may be in the form of a fluorescent tube type light of conventional construction. Mounted on the end wall 48 or on either end wall is a push button stop switch 158 which may be employed to temporarily stop the belt to enable easy observation thereof. A set of three switches 160 is provided in the closure panel 52 and includes a separate main switch, motor switch and a lamp switch. The electrical circuitry is conventional commensurate with various requirements of building codes and the like.

The purpose of the display machine is to repeatedly display sequentially on the endless belt which serves as a carrier, various printed, drawn, photographic or other graphic designs, made directly on the carrier itself, pasted with adhesives, or fastened onto the carrier belt in any manner. The carrier belt can be lighted from behind, front lighted as illustrated or without any separate lights thus using available light such as normal lighting in a building or the like. The travelling belt can form one part of a three part animation display. One of the other parts can be the stationary back-up panel immediately behind the belt on which background material can be drawn, printed, clamped or pasted. The third part can be placed in the foregoing directly in front of the belt or anywhere around the window which exposes the belt to view. The belt in this instance can be transparent or translucent to permit background objects to be viewed or to permit back light to shine therethrough. The belt also can be opaque to permit objects to be drawn, painted, printed directly on it or used as a carrier on which can be fastened with any means, original copies of photographs of ads or articles from newspapers, magazines, books, circulars or any graphic media which may be either mass produced or an original material. The belt can be of paper, or etched surface plastic to take any color chalk and be erasable or a smooth plastic surface to permit marking with a grease pencil or felt tip pen and subsequent easy erasure with chemicals or the like. The belt can be stretched between two rollers for one complete oval travel as illustrated or can travel between any number of idler rollers to provide a longer belt in a small enclosure. The speed of the belt can be varied by changing gear ratios, voltage or motors or providing the motor with a suitable type of speed control mechanism. The machine could be rearranged so that it is supported on the narrow side to permit the belt to travel up or down vertically or when stood on its longer side, as illustrated, the belt will travel horizontally to the right or to the left. The movement of the belt can be automatically interrupted by a timer or by means of the stop button switch 158 or the foot pedal switch 32 placed within reach of the viewer that automatically resets itself when released. If a timer is used, it will stop the motion for a predetermined length of time when the button is touched and not require the button to be held down and this is also true of the foot pedal switch. By employing a long life motor and a belt constructed of a polyester plastic, continuous operation for a long period of time can be expected.

The complete mechanism is made of one unit so that it can be quickly removed from the outer cabinet enclosure for servicing, adjustments, cleaning or in some instances changing the belt or material thereon. The electric connections are equipped with disconnecting plugs to further simplify removal of the mechanism. The clips 86 are attached permanently to the bottom of the cabinet and serve as grounding clips which engage the two center posts 84 providing both grounding and centering of the mechanism in the cabinet. Two additional clips 88 are provided in the hinged lid for this same purpose. Opening the lid and unplugging one electric cord permits removal of the mechanism or the removal or replacement of the endless belt. The bell-crank levers 134 and 138 are interconnected by shaft 132 and are connected to the two pairs of alignment and actuating rods 124 for equal retraction of both ends of roller 70 by a simple twist of the hinged handle 142. This enables the roller 70 to retract sufficient for the endless belt to be easily removed and replaced. To replace the belt, it is simply dropped in place around both rollers and the hinged handle is twisted on top of the bell-crank lever back into the running position. A set of springs at the top and bottom of the internal frame may be provided for keeping the belt tight at all times so that it will rotate without slipping and stand up straight between the rollers for perfect display. The operating lever 134 is constructed so that it goes overcenter and automatically locks in the retracted position with the aid of the springs. The back-up panels 74 behind the belt are so fastened to permit them to spring out and permit the roller 70 (see FIG. 20) to retract sufficiently to permit easy removal of the endless belt and yet back up the entire window area for marking or fastening things to the belt. A spring 75 retains the panels 74 in their normal positions and the corners of the panels 74 are notched at 77 to provide clearance for the end belts on the rollers.

The main power cable to the cabinet terminates in a male plug over an access hole in the bottom of the cabinet and a slot is provided between the hole and the stand for which the electrical cable from the wall plug terminates in a female connector so that it can connect with a matching male plug in the cabinet. The specific details of this construction is not illustrated inasmuch as any convenient means may be provided for electrically connecting the display device to a source of electrical energy. Also, additional viewing sides can be provided by employing additional rollers and making the mechanism square, triangular or any other suitable number of sides.

Each viewing window is covered with transparent material such as glass or plastic which is easily removed by sliding it out through the slots to allow instant access to the belt by store personnel to add to or remove material from the belt message. By providing a serviceable plastic belt to which anything light and flexible can be attached with adhesives or tapes, or clamps it can be considered a travelling bulletin board or display board. By painting, printing or copying by photographic or diazo process directly on the belt, it becomes a sign. By using backgrounds and foregrounds, it becomes an animated sign or animated bulletin board or display for merchandise, printed matter and the like. The cabinet also provides a place to fasten foreground displays, additional signs such as the one on top of the cabinet or boxes for advertising literature and the like. The stand functions to hold trays of flowers or additional foregoing displays or actual merchandise. The power cord may be hidden inside one of the legs of the stand and emerges next to the floor is equipped with a standard electric plug commensurate with the requirements of various building codes and provided with a ground wire for eliminating any possibility of any electrical shock. Also, the device may be constructed of any size commensurate with the installational requirements in each individual situation.

FIGS. 9–21 disclose another embodiment of the above inevntion generally designated by the numeral 170 and includes a hollow cabinet structure including front and rear walls 172 and 174 and end walls 176. The front and rear walls 172 and 174 include enlarged openings 178 which are closed by a closure door 180 supported by a piano hinge 182 at the bottom edge thereof and provided with an enlarged transparent panel 184 therein to enable observation of the material on the endless belt.

The cabinet is also provided with a top wall 186 and a bottom wall 188 supported from support members 190 similar to the support members 16 in FIGS. 1–8. The bottom wall 188 is provided with an opening 192 having a transparent insert 194 therein and a screen and filter insert 196 to enable upward passage of air and the transparent panels 194 permit passage of light downwardly to illuminate the flowers or other material underlying the cabinet. The top wall 186 includes sockets 198 to receive supporting legs 200 for a sign 202. The top wall 186 also includes openings 204 which are screened as at 206 and permit passage of light as well as air to illuminate the sign 202 or the sign may be internally illuminated if desired. Also, the top wall 186 is provided with a pair of recessed push button latches 208 for retaining the closure panels 180 in closed position.

The interior of the cabinet is provided with horizontally disposed fluorescent light tubes 210 adjacent each corner thereof for illuminating the belt and to illuminate the sign 202. An aperture or slot 212 is provided in the front and rear wall adjacent the upper fluorescent tubes 210 and a frosted glass panel with indicia thereon may be provided in the slot-like opening 212 to provide further advertising indicia if desired.

FIG. 15 illustrates the drive roller construction designated by numeral 214 with an end barrel 216 thereon which has a groove 218 therein telescopingly receiving the ends of the roller 214. A suitable driving lug is provided in the groove 218 in engagement with the roller 214 to assure rotation thereof by a frictional drive roller 220 engaging the rubber coating 221 on upper surface thereof. The drive roller 220 is adjustably mounted on a drive shaft 222 on a motor 224 carried by a pivotally supported housing 226 so that the weight of the motor and the housing will retain the friction drive roller 220 against the surface of the end bell 216 of the roller 214. By adjusting the friction drive roller 220 radially of the end bell 216, the rotational speed of the roller and the linear speed of the belt may be adjusted. Suitable electrical conductors 228 are provided for the motor together with a switch associated with one of the finger holes 230 in the top wall 186 to enable operation of the motor. The other finger hole 232 is provided for operating a switch for energizing the fluorescent lights 210.

FIG. 17 illustrates the construction of the top wall 186 and the guide bracket 234 thereon which has a curved depending central member 236 for guiding the roller assembly and framework 238 and centering it in generally the same manner as the removable frame and roller assembly illustrated in FIGS. 1–8. The bracket 234 and the central member 236 thereon serve to centralize the removable roller frame.

Extending along the bottom corners of the cabinet, tubes 240 are proivded for receiving the conductors and similar hollow tubes 242 are disposed in the vertical corners of the cabinet for the conductors and ballast 244 is provided adjacent the end corners of the cabinet so that the ballast will occupy the space normally empty due to the curvature of the roller and the spatial relation thereof to the end walls thus decreasing the overall-size of the cabinet while providing all the necessary items therein. The circulation of air through the cabinet due to convection air currents will retain the interior of the cabinet in a safe and cool condition.

The front of the cabinet is provided with a momentary stop switch 246 disposed in the front wall 172 and includes a circular transparent or frosted glass insert 248 and stop button or knob 250 movable through a hole therein. The knob 250 is mounted on a transparent plastic plate 252 that has a contact member 254 on one end thereof for engaging a momentary contact switch 256. A transparent leaf spring 258 is attached to the other end of plate 252 and the front wall 172 and a limit member 260 limits inward movement of the spring 258 and guides the movement thereof to bias the knob 250 to the outer position. Thus, as the button or knob 250 is pushed inwardly, the beltmotor 224 will be stopped to enable the advertising material on the belt to be easily viewed.

Suitable indicia may be provided adjacent the switch assembly 246 to indicate that this is a stop switch. The indicia as well as the tarnsparent plate 248 are interiorly lighted to draw attention to this area of the cabinet. Also, advertising material may be provided adjacent the switch in the form of a back lighted or interiorly lighted frosted glass insert.

Each of the fluorescent lights 210 is provided with a blind or partition 262 on both sides of the light to control ilumination through the tarnsparent panels 184 in the front and rear walls so that the light will shine on the material on the belt rather than into the eyes of the person looking out the device.

Figure 13:
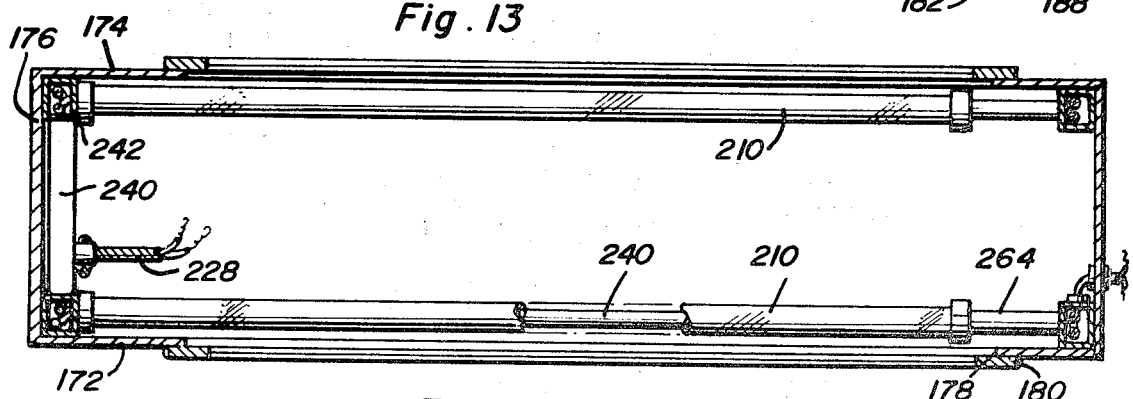
FIG. 13 is a longitudinal, plan sectional view taken substantially upon a plane passing along section line 13—13 of FIG. 9 illustrating the internal construction of the lower portion of the cabinet.
Figure 14:
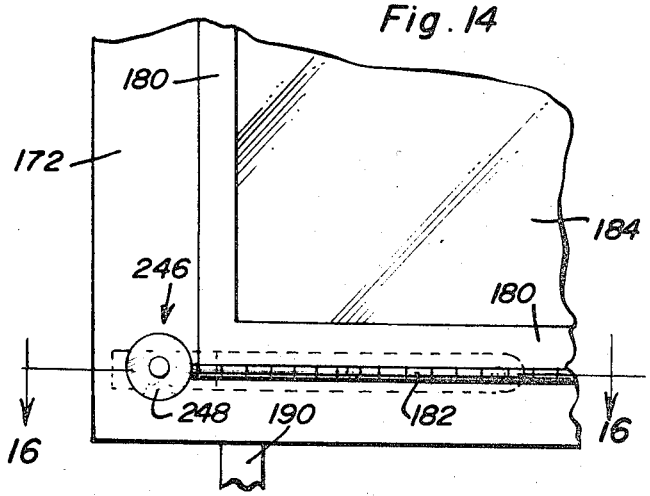
FIG. 14 is a fragmental elevational view of one corner of the cabinet illustrating the operating switch structure.

In order to illuminate the transparent plate 248, the fluorescent tubes 210 are offset to that side of the cabinet with extensions 264 being provided for supporting the sockets which receive the fluorescent tubes at the other end thereof as illustrated in FIG. 13. The hidden latches 208 are in the form of spring-loaded catches in which a button is depressed in the socket to move the spring loaded plunger to a retracted position to enable the door to be opened. All the electrical wiring is disposed interiorly of the tubular ducts and all switches and latches are concealed except for the knob 250 which is illuminated and provided on the fornt of the cabinet and a corresponding switch may be provided on the rear of the cabinet if the cabinet is supported on a free standing stand.

FIG. 18 illustrates a latch construction 208 which includes the rod 280 constructed of clear plastic or the like having a knob at the upper end thereof and having the lower end threaded through a threaded nut 281 so that by rotation of the rod, the threaded portion thereof will cause the rod to move inwardly to engagement with a keeper latch or anvil 282 fastened to the movable window frame 180. Thus, by rotating the rod 280, it may be moved upwardly and downwardly for latching and unlatching engagement. The clear plastic rod leaves no shadow on the display window 212. Further, the threads on the rod may be relatively coarse so that it will require only several turns to move the rod upwardly or downwardly. The keeper or anvil 282 may be inclined so that the movable window frame 180 may be cammed or pulled tightly into engagement with the front panel for providing a dust seal.

FIG. 19 illustrates another type of latch structure 208 which includes a push rod 283 having a transparent section 284 in alignment with the display window 212. The spring loaded sleeve assembly 285 is mounted on the window frame 180 and includes a detent or bullet shaped member 286 therein which engages the lower end of the push rod 283 so that when the push rod is depressed, the projection 286 will be forced back into the sleeve assembly 285 thus enabling the window frame 180 to be pivoted outwardly. The lower portion of the push rod 283 is offset at 287 to engage the projection 286 and is guided by a guide structure 288 mounted on the inner surface of the front panel 172. This eliminates the shadows on the display window 212 and provides a concealed depressible push button arrangement to enable easy opening of the window panel 180.

FIG. 21 illustrates an alternative arrangement in which the vertical wall 46 or 48 is provided with a pair of vertical ramps 276 mounted in front of a reflector 277 which has an arcuate center section generally conforming the periphery of the end roller 68 and slightly spaced therefrom so that it will not interfere with movement of the web. A frosted glass panel 278 closes the opening in the end panel 46 and right angular clips or retaining members 279 are provided for retaining the window 278 in place. Any suitable indicia may be provided on the frosted glass panel 278 for illumination by the vertical lights and this additional illumination and advertising area may be provided on either embodiment of the invention.

If desired, the transparent enlarged window 184 may be left open or provided with any suitable indicia if desired. Also, if desired, the device may be hung against the wall in which event only one transparent window is necessary and the top sign may be illuminated by a slot provided in the top wall or the top sign may be interiorly illuminated with a suitable light fixture wired to the motor circuit or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A belt display comprising a cabinet having at least one viewing opening therein, a belt having a message thereon movable past said opening to enable viewing thereof, internal frame means disposed within said cabinet for supporting said belt and including drive means therefor, and means supporting said internal frame means including the drive means in said cabinet for removal as a unit, said frame means including at least a pair of rollers over which said belt is entrained, and means for moving one of said rollers in relation to the other to enable removal and replacement of the belt, said cabinet including an openable wall portion to enable access to the interior, said means removably mounting the internal frame means including a pair of supporting, centering and grounding clips attached to a wall of the cabinet opposite to the openable wall portion and a pair of supporting, centering and grounding clips on the openable wall portion to support the internal frame means within the cabinet with the clips on the openable wall portion disengaging from the frame means when the openable wall portion is opened.

2. The structure as defined in claim 1 wherein said means moving one of the rollers includes a pair of alignment rods attached to each end of the roller for enabling rotation of the roller and reciprocation thereof while maintaining the axes of said rollers in parallel relation and maintaining equal tension on the top and bottom of the belt, means guiding said rods on said frame means, and manually operated bell-crank means attached to said rods for reciprocating said rods thus moving the movable roller.

3. The structure as defined in claim 2 wherein said internal frame means includes upper and lower frame rails, backing panels for the belt extending between the frame rails generally tangential to the rollers.

4. The structure as defined in claim 3 wherein said viewing opening is provided with a transparent panel forming a closure therefor, said cabinet including a slot and track assemblies slidably associated with the slot for slidably receiving the transparent panel to enable removal thereof to provide access to the belt for changing material on the belt, said cabinet being supported from a supporting stand including vertically disposed legs, a supporting tray extending between the legs below said cabinet, foot operated control means disposed adjacent the floor surface and attached to said stand to enable control of movement of the belt, said cabinet including an upwardly extending support structure including a panel for receiving indicia thereon for additional display, said cabinet including external illumination means mounted on the wall thereof above the opening for illuminating the viewing opening, said openable wall portion being in the top wall of the cabinet and the internal frame means being vertically movable through the top wall of the cabinet, said cabinet being generally rectangular with an enlarged viewing opening in the front and rear wall thereof to enable observation of the belt from both sides of the cabinet.

5. The structure as defined in claim 1 wherein said viewing opening is provided with a transparent panel forming a closure therefor, said cabinet including a slot and track slidably receiving the transparent panel to enable removal thereof to provide access to the belt for changing the material on the belt.

6. The structure as defined in claim 1 wherein said cabinet is supported on a supporting stand including vertically disposed legs, a supporting tray extending between said legs below said cabinet, and control means disposed adjacent the floor surface to enable control of movement of the belt.

7. The structure as defined in claim 1 wherein said cabinet is provided with external illumination mounted on the wall thereof in overlying relation to the opening for illuminating the viewing opening, said belt being electrically operated, and a manual stop switch on said cabinet for stopping the belt wherever desired.

References Cited

UNITED STATES PATENTS

| | | | |
|---|---|---|---|
| 1,400,081 | 12/1921 | La Roche | 40—32 |
| 2,055,857 | 9/1936 | Brown | 40—32 |
| 2,298,990 | 10/1942 | Utne | 40—32 |
| 2,526,817 | 10/1950 | Harness | 40—32 |
| 2,867,050 | 1/1959 | Westfall | 40—32 |

LAWRENCE CHARLES, Primary Examiner